United States Patent Office 3,025,266
Patented Mar. 13, 1962

3,025,266
POLYESTERS PREPARED FROM A MIXTURE OF AROMATIC AND SPECIFIC SATURATED ALIPHATIC DIBASIC ACID OR ESTER DERIVATIVES THEREOF CONDENSED WITH A GLYCOL AND A PROCESS FOR PREPARING SAME
William A. H. Huffman, Decatur, Ala., assignor to The Chemstrand Corporation, Decatur, Ala., a corporation of Delaware
No Drawing. Filed Aug. 19, 1958, Ser. No. 755,862
11 Claims. (Cl. 260—75)

This invention relates to new and improved high molecular weight modified polyesters. More particularly, this invention relates to fiber-forming modified polyesters of excellent physical properties having improved dyeability, solubility and solution stability, and to methods for making the same.

This application is a continuation-in-part of application Serial No. 682,272, filed September 6, 1957 (now abandoned).

Linear polyesters which are polymers containing ester linkages can be made by heating together dihydric alcohols or functional derivatives thereof and dibasic carboxylic acids or polyester-forming derivatives thereof, such as acid halides, salts, or simple esters of dibasic acids and volatile monohydric alcohols. Highly polymerized polyesters can be formed into filaments, fibers, and the like, which can be permanently oriented. The high molecular weight polyesters are relatively insoluble, chemically inactive, hydrophobic materials capable of being formed into filaments which can be cold-drawn to produce textile fibers of superior strength and pliability. The most widely known and most important commercially of the polymeric polyesters is that prepared by the condensation of terephthalic acid or dimethyl terephthalate and ethylene glycol.

However, these polyester materials cannot be dyed satisfactorily by the ordinary dyeing procedures used in dyeing cotton, wool, natural silk, and regenerated cellulose. Unless a fiber-forming polyester can be readily dyed in commercial dyeing equipment, the utility of the polymer in the textile field is limited. The compact structure of polyethylene terephthalate fibers, the molecules of which are closely packed along the axis of the fiber, makes it quite difficult, except with a limited number of dyes, to obtain a high degree of dyebath exhaustion, or to secure satisfactory deep shades. Absorption and penetration of the dye into the fiber core are limited by inherent properties of the fiber.

A number of methods have been proposed to increase the dyeability of the polyesters and particularly polyethylene terephthalate. However, these methods have not proved to be entirely satisfactory. One method involves treatment of the fibers with acids, bases, or inorganic salts with the property of hydration. Another known method of building dyeability with acid dyestuffs into a non-dyeable fiber is that of incorporating basic nitrogen in the polymer. However, in the case of polyethylene terephthalate, attempts to copolymerize ethylene glycol and a terephthalic acid derivative with a glycol or dibasic acid containing an amine group does not produce satisfactory fiber-forming materials. When glycols and dibasic acids containing primary and secondary amino groups are employed, cross-linked polymers are generally obtained which are not suitable for use in the manufacture of fibers, filaments, and the like. Further, attempts to form copolymers from glycols and dibasic acids containing a tertiary amine group, by the usual known methods, have resulted in low molecular weight polymers which in addition to being dark in color, were not suitable for filament and fiber formation. Accordingly, the art has desired other means to increase the dyeability of polyester structures, such as fibers, filaments, films, and the like.

It is a general object of this invention to provide improved and modified high molecular weight fiber-forming polyesters which have improved dyeing characteristics including increased affinity for dyestuffs and particularly the dispersed acetate dyestuffs, which polyesters also have a useful balance of other desirable physical properties. It is a further object of this invention to provide a new and improved process for preparing modified polyesters. Other objects and advantages of the invention will be apparent from the description thereof which follows.

The objects of this invention are attained through the use of modifying amounts of dialkyl esters of saturated, essentially linear dicarboxylic aliphatic acids containing 20 carbon atoms condensed with a glycol and an aromatic dicarboxylic acid or ester thereof to produce high molecular weight fiber-forming polyesters having increased dye affinity and a useful balance of desirable physical properties. Quite unexpectedly, it was found that the novel and improved modified polyesters of this invention had improved solubility in polyester solvents and the resulting polyester solutions had greatly improved stability as compared to solutions of unmodified polyesters, and solutions of these modified polyesters may be readily wet spun into valuable filaments which is to be contrasted with the difficulties experienced in attempts to wet spin polyethylene terephthalate. It was further unexpectedly found that polyesters could be modified with dialkyl esters of $C_{20}$ dicarboxylic acids to provide polyesters of improved dyeability, better solubility in polyester solvents and improved solution stability without reducing the softening or melting point of the polyester below that required for useful fiber-forming materials. The melting points of the modified polyesters are above 200° C. and ordinarily are in the range of 220–250° C. It was also unexpectedly found that the modified polyesters possessed crystallinity of a degree comparable to that of unmodified polyesters so that useful fibers of good tenacity could be prepared therefrom.

The dialkyl esters of saturated essentially linear aliphatic dicarboxylic acids containing 20 carbon atoms have the general formula

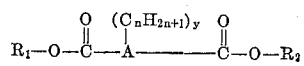

wherein $R_1$ and $R_2$ are alkyl radicals containing from 1 to 10 carbon atoms and more preferably are alkyl hydrocarbon radicals containing from 1 to 5 carbon atoms including methyl, ethyl, propyl, isopropyl, n-butyl, sec. butyl, isobutyl, n-amyl, isoamyl, and the like; A is a linear saturated aliphatic radical containing from 14 to 18 carbon atoms in its chain; $n$ is an integer of either 1 or 2; and $y$ is an integer from 0 to 2. The total number of carbon atoms in A and the side chains thereof is 18. $R_1$ and $R_2$ may be the same or may be different alkyl radicals. Representative dialkyl esters found useful in this invention include dialkyl 1,20-eicosane dioate, dialkyl 8-ethyl octadecane-1, 18-dioate, dialkyl dimethyl octadecane-1,18-diate, dialkyl diethylhexadecane-1,16-dioate and the like, where the dialkyl groups are methyl, ethyl, propyl, and the like including alkyl hydrocarbon radicals containing from 1 to 5 carbon atoms. Mixtures of any of the materials described above may also be used. For example, mixtures of about 20 to 80 weight percent of dimethyl 1,20-eicosane dioate and about 80 to 20 weight percent of dimethyl 8-ethyl octadecane-1,18-dioate are quite useful.

The glycols employed in the preparation of the modified polyesters of this invention may be any glycol containing from 2 to 10 carbon atoms and more preferably are polymethylene glycols of the general formula $$HO(CH_2)_nOH$$

wherein $n$ is an integer from 2 to 10 and preferably 2 to 6. Ethylene glycol is found particularly useful in preparing the modified polyesters of this invention. At least about one molar proportion of the glycol per molar proportion of the dimethyl terephthalate and dialkyl ester of a $C_{20}$ acid is employed. Generally, however, higher proportions of the glycol relative to the esters or acids are used. For example, up to five moles of glycol per mole of dibasic acids or esters are often employed because the initial interchange reaction takes place more readily in the presence of an excess of ethylene glycol.

The dibasic dicarboxylic acids of this invention may be any of those employed by those skilled in the art to make fiber-forming polyesters but more preferably are aromatic dibasic dicarboxylic acids such as p,p'-dicarboxy diphenyl, naphthalene dicarboxylic acids such as 2,6-dicarboxy naphthalene, p,p'-dicarboxy diphenyl sulfone, terephthalic acid, isophthalic acid and the like or dialkyl esters thereof. Of particular value in preparing the modified polyesters of this invention is terephthalic acid and dialkyl esters thereof such as dimethyl terephthalate and similar dialkyl esters wherein the alkyl groups are the same or different alkyl radicals, preferably alkyl hydrocarbon radicals containing 1 to 5 carbon atoms thereof. Isophthalic acid and its dialkyl esters also may be employed to make the modified polyesters of this invention. Copolymers of two or more glycols and two or more dibasic carboxylic acids or esters thereof may also be modified in accordance with the present invention. Of particular utility as reactants is a mixture of dimethyl terephthalate, dimethyl isophthalate and ethylene glycol.

The amounts of necessary reactants employed to make the modified polyesters of the invention, on a molar basis, are ordinarily one mole equivalent of a mixture of the above two types of dialkyl esters of aromatic and $C_{20}$ dicarboxylic acids and a molar excess of the glycol. In the mixtures of the dialkyl esters, the dialkyl aromatic dicarboxylic acid esters are present in amount from about 65 to 95 weight percent and the dialkyl ester of the aliphatic $C_{20}$ dicarboxylic acid is present in amount from about 35 to about 5 weight percent. Smaller amounts of the dialkyl esters of the $C_{20}$ acids, as about 5 to 20, result in polyesters having a good balance of physical properties.

It is generally desirable to employ a catalyst in order to speed up the condensation reactions. Any well-known esterification catalyst may be employed such as p-toluenesulfonic acid, camphorsulfonic acid, zinc acetate, cobaltous acetate, zinc succinate, antimony oxide, and the like. However, it is preferred to employ manganous formate as a catalyst since it enables the production of higher viscosity polyesters in a shorter period of time.

A preferred modified polyester prepared in accordance with the present invention is that produced from dimethyl terephthalate, dimethyl 1,20-eicosane dioate and ethylene glycol. In the preferred practice of the instant invention, the reaction vessel is charged with necessary amount of dimethyl terephthalate, dimethyl 1,20-eicosane dioate and ethylene glycol; chain-terminators such as monohydroxy compounds represented by methoxy-polyethylene glycol, and chain-branching agents or cross-linking agents such as the polyhydroxyl compounds represented by pentaerythritol, and the like, if desired; and as a catalyst, manganous formate. The mass is then heated under nitrogen for approximately 1 to 3 hours at a temperature in the range of about 175° C. to remove the methanol formed by the ester interchange reaction. Thereafter the temperature is raised to remove the ethylene glycol and then the vessel is evacuated to less than 1 mm. and the reaction mass heated above its melting point, a temperature in the range of about 300° C., and maintained at such temperature for about 3 hours.

Generally, in the practice of the present invention the calculated amounts of reactants are charged to a reaction vessel and the reaction is conducted essentially as outlined above. The first step or stage of the reaction is ordinarily carried out at atmospheric pressure and at a temperature in the range of above 65° C., normally about 90° to about 250° C. and preferably between about 150° C. and 225° C., depending upon the alcohol byproduct to be removed from the reaction mixture and the boiling point of the organic medium employed and ordinarily is conducted in the presence of from 0.001 to 1.0 percent by weight, based on the weight of the dicarboxylic acid or ester thereof, of a suitable esterification catalyst such as manganous formate. If desired, the reaction may be carried out a pressures above or below atmospheric. The alcohol evolved is continuously removed by distillation. At the completion of the first stage, the excess glycol, if any, is distilled off prior to entering the second stage of the reaction.

In the second stage of the reaction, the reaction mass is preferably heated at a temperature above the melting point thereof which of course will vary with the nature of the polymer or intermediate product obtained, in the absence of oxygen. The temperature is maintained throughout the second stage at a point sufficiently high to maintain a molten mass in the reaction vessel. The heating is continued until the melt produced has cold-drawing properties, i.e., filaments formed from the melt are capable of being cold-drawn. The heating may be carried out at atmospheric or subatmospheric pressures, and preferably at low pressure in an inert atmosphere in the absence of oxygen. This may be accomplished by bubbling an inert gas, such as nitrogen, through the molten mass. Any inert gas may be employed and nitrogen containing less than 0.003 percent oxygen is normally used. For optimum results, a very low pressure in the range of less than 1 mm. to 5 mm. of mercury is employed. During this second stage, glycol is eliminated which is readily volatilized under these conditions and removed from the system. The temperature of this second stage normally is in the range of 200° C. to about 325° C., preferably at about 300° C. It is also desirable that a catalyst also be present during this second stage reaction since in the absence of a catalyst a slow reaction requires prolonged heating which often causes undesirable color formation in the finished polymer.

It is believed that polyethylene terephthalate has the dye sites required to obtain a satisfactorily dyed article therefrom but such drastic conditions are required to obtain dyeing that there is a resultant decrease in other desirable properties of the article. Polyethylene terephthalate has such a dense structure that dye cannot penetrate the polymer except under drastic conditions, such as by use of dye carriers (swelling agents), high temperatures and high pressures for prolonged period of time. However, by means of the instant invention, a polymer is provided which is readily dyed and it is believed that the structure of the polymer, i.e., the chain packing of the unmodified polyethylene terephthalate, is lessened or opened up since the rate of dyeing is markedly increased under less drastic conditions. That is, the dye can penetrate into the polymer or article produced therefrom, such as a filament or fiber, much more rapidly under less strenuous conditions, thereby alleviating the danger of adversely affecting other desirable properties of polymer or polymer article.

The preferred modified linear condensation polyesters, produced in accordance with the present invention, have a specific viscosity ($N_{sp}$) of approximately 0.30 to 0.60. This represents the modified polyesters which can be formed into cold drawable fibers and filaments. It is to be understood, of course, that non-fiber-forming modified polyesters may be produced in accordance with this invention which have a greater or less specific viscosity than that reiterated above.

Specific viscosity, as employed herein, is represented by the formula:

$$N_{sp} = N_{Rel.} - 1$$

where $$N_{Rel.} = \frac{\text{Time of flow of the polymer solution in seconds}}{\text{Time of flow of the solvent in seconds}}$$

Time of flow measurements of the polymer solutions and solvent were made by allowing said solutions and solvent to flow by gravity at 25° C. through a capillary viscosity tube and timing the flow between points on said capillary tube. In all determinations of polymer solution viscosities, a polymer solution containing 0.5 percent by weight of the polymer dissolved in a solvent mixture containing two parts by weight of phenol and one part by weight of 2, 4, 6-trichlorophenol and 0.5 percent by weight of water, based on the total weight of the mixture, was employed.

To further illustrate the present invention and the advantages thereof, the following specific examples are given, it being understood that these are merely intended to be illustrative and not limitative. Unless otherwise indicated, all parts and percents are by weight.

*Example I*

In this example unmodified polyethylene terephthalate was prepared to be employed as a control or standard for comparison with the modified polyesters. A mixture or charge of 41 grams of dimethyl terephthalate, 44 ml. of ethylene glycol and 20 mg. of manganous formate was placed in a reaction vessel fitted with a distilling column and heated under nitrogen atmosphere at approximately 178° C. for a period of 1½ hours. The methanol formed during the reaction was distilled out of the reaction vessel. After all the methanol was removed, the temperature of the reaction mixture was raised to 287° C. for a period of 30 minutes in order to remove by distillation the excess glycol in the vessel. The system was then placed under vacuum and the pressure reduced to less than 1 mm. mercury while maintaining the temperature at 287° C. The polymerization was allowed to proceed for approximately 3 hours to form a polymer in the fiber-forming range which was cold-drawable. The ethylene glycol, formed during the polymerization reaction, was distilled off and collected. The polymer obtained was a light straw color with a melting point in air at about 255° C. and filaments produced therefrom were cold-drawable. The polymer was ground until it passed through a 40 mesh screen and the ground polymer was dyed in a dye-bath containing 4 percent, based on the weight of the polymer being dyed, of Eastman Blue GLT dye, at 200° F. for 3 hours. The polymer was removed from the bath, filtered, washed and the filtrate analyzed to determine the amount of dye removed from the bath by the polymer. It was found that 69.3 percent of the dye in the bath was extracted by the polymer.

*Example II*

Following the general experimental procedure set forth in Example I, 57.4 grams of dimethyl terephthalate (70 weight percent of the total diester) 24.6 grams of dimethyl esters of a $C_{20}$ dicarboxylic acid (a mixture of 57 percent dimethyl 1,20-eicosane dioate and 43 percent dimethyl 8-ethyl octadecane-1,18-dioate, this mixture being 30 weight percent of the total diester), 60 milligrams of manganous formate and 88 ml. of ethylene glycol (an excess), were reacted together by heating at about 180° C. for 90 minutes until ester interchange was completed and the methanol removed, then at 250 to 290° C. for 4 hours to remove the excess ethylene glycol, and finishing under high vacuum. A high molecular weight polymer having a melting point of about 230° C. was obtained which was readily melt spun in a pressure extrusion apparatus to filaments of excellent color and strength. These filaments were readily cold-drawn to filaments with a high degree of extensibility and recovery. Samples of this polyester were ground to 40 to 60 mesh and were dyed with the dispersed acetate dyestuff Eastman Blue GLT (4 percent owf.). This polymer extracted more dye and was dyed to a markedly deeper shade than the unmodified polyethylene terephthalate of Example I. This polymer dissolved readily in meta-cresol, 6-tertiary butyl meta-cresol and in liquid phenol by heating to 60 to 75° C. Twenty to 30 percent solutions in meta-cresol and phenol-water (90:10) were obtained which were stable at 30° C. and were viscous enough to be wet spun on conventional wet spinning equipment. A 35 percent viscous dope in phenol of this modified polyester was stable at 58° C. for longer than nine hours. The unmodified polyethylene terephthalate of Example I required heating to over 100° C. to effect solution and gave much less stable solutions that were stable only above 100° C. and such solutions had viscosities too low for practical wet spinning processes. This modified polyester had a specific viscosity of 0.352, a tensile strength of 2.7 g./d. and an elongation of 49 percent.

*Example III*

Following the procedure of Example II, modified polyethylene terephthalates were prepared wherein the mixed dimethyl esters of the $C_{20}$ acid were used in 10 and 20 weight percent proportions of the total diester. The melting points of these products were, for the 10 percent modification, 255° C.; and for the 20 percent modification, 245° C. These two modified polyethylene terephthalates were melt spun into filaments which when drawn had good extensibility and recovery. Dyeability of these modified polyethylene terephthalates with Eastman Blue GLT was markedly improved both as to rate of dyeing and depth of shade over the unmodified polyethylene terephthalate of Example I and in each case extracted about 81 percent of the dye. The dyed fibers performed very well in a wash fastness test and a dry cleaning test. Solutions of these two modified polyethylene terephthalates in meta-cresol and liquid phenol were readily obtained in 10 to 25 percent concentrations and the resulting solutions were stable to 35° C. to 40° C. The specific viscosity of the 10 percent modified polyester was 0.393, and the 20 percent modified polyester was 0.409. The tensile strength of the 10 percent modified polyester was 4.25 g./d. and elongation was 10 percent. The tensile strength of the 20 percent modified polyester was 2.6 g./d. and elongation was 29 percent. A modified polyester of 25 percent dimethyl ester of the $C_{20}$ acid had a specific viscosity of 0.410 and a 25 percent dope in meta-cresol was stable at 30° C. The modified polyesters of Examples II and III were readily wet spun in conventional equipment to filaments of good quality from phenol solutions.

*Example IV*

Example II was repeated with 24.6 grams of dimethyl 1,20-eicosane dioate instead of the mixture of $C_{20}$ esters. A high molecular weight polyester was obtained which was readily melt spun into filaments of excellent color and strength and which were cold-drawn to filaments with a high degree of extensibility and good recovery. Forty to 60 mesh samples of this polyester were easily dyed to deep shades with Eastman Blue GLT. The polymer was soluble in meta-cresol and formed dopes of 10, 20 and 30 percent concentration which were stable at 30° C.

*Example V*

A mixture of 57.4 grams of dimethyl terephthalate, 24.6 grams of dimethyl 1,20-eicosane dioate, 40 milligrams of manganous formate and 98 grams of ethylene glycol was heated at 175° C. under a nitrogen atmosphere for 90 minutes to complete the ester interchange reaction. The reaction mixture was then heated at 285° C. for 30 minutes to remove the excess ethylene glycol. The reaction was completed by heating at 285° C. at a pressure of less than 1 millimeter of mercury for 3 hours. The resulting polymeric product was a cream colored crystalline material having a melting point of about 225° C. in air. A 10 percent polution of this product in chloroform was obtained by heating a mixture of the polymer and chloroform to 50° C. Similar solutions are readily prepared in other chlorine containing solvents such as tetrachloroethane, trichloroethylene and the like. The inner surface of a glass container was coated with this solution and the chloroform was evaporated to provide a thin, tough, flexible abrasion resistant coating to protect the glass surface. This adherent film is resistant to boiling water and steam including sterilizing conditions.

The modified polyesters and copolyesters made in accordance with the present invention show increased dye-receptivity when dyed by known commercial techniques. The polymers show particularly increased dye-receptivity with the dispersed acetate dyestuffs, for example, Celanthrene Fast Yellow GL Conc. 300% (Pr 534), Acetamine Orange GR Conc. 175% (Pr 43), Celanthrene Fast Pink 3B (Pr 235), Celanthrene Brilliant Blue FFS Conc. 200% (Pr 228), and the like.

When the above samples are repeated with other dialkyl $C_{20}$ alkane dioates such as diethyl and dipropyl 1,20-eicosane dioates, with other dialkyl terephthalates and dimethyl isophthalate, other polymethylene glycols such as tetramethylene glycol and the like, similar improved modified polyesters are obtained.

The modified polyesters of this invention find many uses as coating and impregnating materials and in the form of film and are quite valuable as molding materials. Glass and metal surfaces and glass fibers are effectively coated with the modified polyesters to form valuable articles. The outstanding use of these modified polyesters of course is in the textile field where these improved polyesters because of their enhanced dyeability, solubility and solution stability and physical properties find many uses readily recognized by those skilled in the art.

It is not the intention of the inventor that the invention be limited solely to the details of the embodiment set forth above as it will be recognized by the man skilled in the art that numerous and obvious modifications conforming to the spirit of the invention may be made and it is intended that the invention be limited solely by the scope of the appended claims.

What is claimed is:

1. A fiber-forming modified polyester melting at a temperature of above 200° C. and having improved dye receptivity and solubility consisting of the reaction product of one mole equivalent of a mixture of 95 to 65 weight percent of at least one compound selected from the group consisting of terephthalic acid, isophthalic acid, and dialkyl esters of said acids, the alkyl radicals of said esters containing 1 to 5 carbon atoms, and 5 to 35 weight percent of at least one dialkyl ester of a saturated aliphatic dicarboxylic acid containing 20 carbon atoms of the general formula

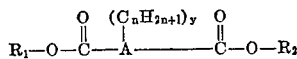

wherein $R_1$ and $R_2$ are alkyl radicals containing 1 to 10 carbon atoms, A is a linear saturated aliphatic radical containing 14 to 18 carbon atoms, n is an integer of 1 to 2 and y is an integer of 0 to 2 and wherein the total number of carbon atoms in A and the side chains thereof is 18, and a molar excess of at least one polymethylene glycol containing 2 to 10 carbon atoms.

2. The modified polyester of claim 1 wherein the dialkyl ester of terephthalic acid is present in amounts from about 95 to 65 weight percent of the total dialkyl esters.

3. The modified polyester of claim 1 wherein the dialkyl ester of terephthalic acid is present in amounts from about 95 to 80 weight percent of the total dialkyl esters and wherein the polymethylene glycol is ethylene glycol.

4. A fiber-forming modified polyester melting at a temperature of about 220–225° C. and having improved dye receptivity and solubility consisting of the reaction product of one mole equivalent of a mixture of 95 to 65 weight percent of dimethyl terephthalate and 5 to 35 weight percent of dimethyl 1,20-eicosane dioate and a molar excess of ethylene glycol.

5. A fiber-forming modified polyester melting at a temperature of about 220–255° C. and having improved dye receptivity and solubility consisting of the reaction product of one mole equivalent of a mixture of 95 to 65 weight percent of dimethyl terephthalate and 5 to 35 weight percent of a mixture of dimethyl 1,20-eicosane dioate and dimethyl 8-ethyl octadecane-1,18-dioate and a molar excess of ethylene glycol.

6. A fiber-forming modified polyester melting at a temperature of about 220–255° C. and having improved dye receptivity and solubility consisting of the reaction product of one mole equivalent of a mixture of 95 to 80 weight percent of dimethyl terephthalate and 5 to 20 weight percent of a mixture of about 20 to 80 weight percent dimethyl 1,20-eicosane dioate and about 80 to 20 weight percent dimethyl 8-ethyl octadecane-1,18-dioate and a molar excess of ethylene glycol.

7. A method for preparing a fiber-forming modified polyester having improved dye affinity consisting of condensing in a reaction vessel one mole equivalent of a mixture of 95 to 65 weight percent of at least one compound selected from the group consisting of terephthalic acid, isophthalic acid, and dialkyl esters of said acids, the alkyl radicals of said esters containing 1 to 5 carbon atoms, and 5 to 35 weight percent of at least one dialkyl ester of a saturated aliphatic dicarboxylic acid containing 20 carbon atoms of the general formula

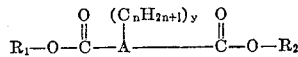

wherein $R_1$ and $R_2$ are alkyl radicals containing 1 to 10 carbon atoms, A is a linear saturated radical containing 14 to 18 carbon atoms, n is an integer of 1 to 2 and y is an integer of 0 to 2 and where the total number of carbon atoms in A and the side chains thereof is 18, with a molar excess of at least one polymethylene glycol containing 2 to 10 carbon atoms, in the presence of a catalytic amount of an esterification catalyst, at an elevated temperature and in an inert atmosphere and thereafter continuing the condensation under a very low pressure, at a temperature sufficiently high to maintain a molten mass in the reaction vessel and in an inert atmosphere until a polymer having a melting point of above 200° C. is produced.

8. A method for preparing a fiber-forming modified polyester having improved dye affinity consisting of condensing in a reaction vessel one mole equivalent of a mixture of 90 to 70 weight percent of dimethyl terephthalate and 10 to 30 weight percent of at least one dialkyl ester of a saturated aliphatic dicarboxylic acid containing 20 carbon atoms of the general formula

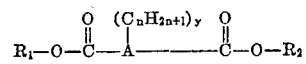

wherein $R_1$ and $R_2$ are alkyl radicals containing 1 to 10 carbon atoms, A is a linear saturated radical containing 14 to 18 carbon atoms, n is an integer of 1 to 2 and y is an integer of 0 to 2 and where the total number of carbon atoms in A and the side chains thereof is 18, with a molar excess of ethylene glycol, in the presence of a catalytic amount of an esterification catalyst, at an elevated temperature and in an inert atmosphere and thereafter continuing the condensation under a very low pressure, at a temperature sufficiently high to maintain molten mass in the reactor vessel and in an inert atmosphere until a polymer having a melting point of above 200° C. is produced.

9. A method for preparing a fiber-forming modified polyester having improved dye affinity consisting of condensing one mole equivalent of a mixture of 90 to 70 weight percent of dimethyl terephthalate and 10 to 30 weight percent of dimethyl 1,20-eicosane dioate with a molar excess of ethylene glycol in the presence of 0.001 to 1.0 weight percent manganous formate, at a temperature of 65 to 225° C. and in an inert atmosphere and thereafter continuing the condensation under a pressure in the range of less than 1 mm. to 5 mm. of mercury, at a temperature of 200 to 325° C. and in an inert atmosphere until a polymer having a melting point of about 220–255° C. is produced.

10. A method for preparing a fiber-forming modified polyester having improved dye affinity consisting of condensing one mole equivalent of a mixture of 90 to 70 weight percent of dimethyl terephthalate and 10 to 30 weight percent of dimethyl 8-ethyl octadecane-1,18-dioate with a molar excess of ethylene gylcol in the presence of 0.001 to 1.0 weight percent manganous formate, at a temperature of 65 to 225° C. and in an inert atmosphere and thereafter continuing the condensation under a pressure in the range of less than 1 mm. to 5 mm. of mercury, at a temperature of 200 to 325° C. and in an inert atmosphere until a polymer having a melting point of about 220–255° C. is produced.

11. A method for preparing a fiber-forming modified polyester having improved dye affinity consisting of condensing one mole equivalent of a mixture of 90 to 70 weight percent of dimethyl terephthalate and 10 to 30 weight percent of a mixture of dimethyl 1,20-eicosane dioate and dimethyl 8-ethyl octadecane-1,18-dioate with a molar excess of ethylene glycol in the presence of 0.001 to 1.0 weight percent manganous formate, at a temperature of 65 to 25° C. and in an inert atmosphere and thereafter continuing the condensation under a pressure in the range of less than 1 mm. to 5 mm. of mercury, at a temperature of 200 to 325° C. and in an inert atmosphere until a polymer having a melting point of about 220–255° C. is produced.

References Cited in the file of this patent

UNITED STATES PATENTS

| | | |
|---|---|---|
| 2,623,033 | Snyder | Dec. 23, 1952 |
| 2,744,091 | Caldwell | May 1, 1956 |